May 15, 1934.  F. H. DASSE  1,958,566
BASKET HANDLE
Filed Feb. 13, 1931
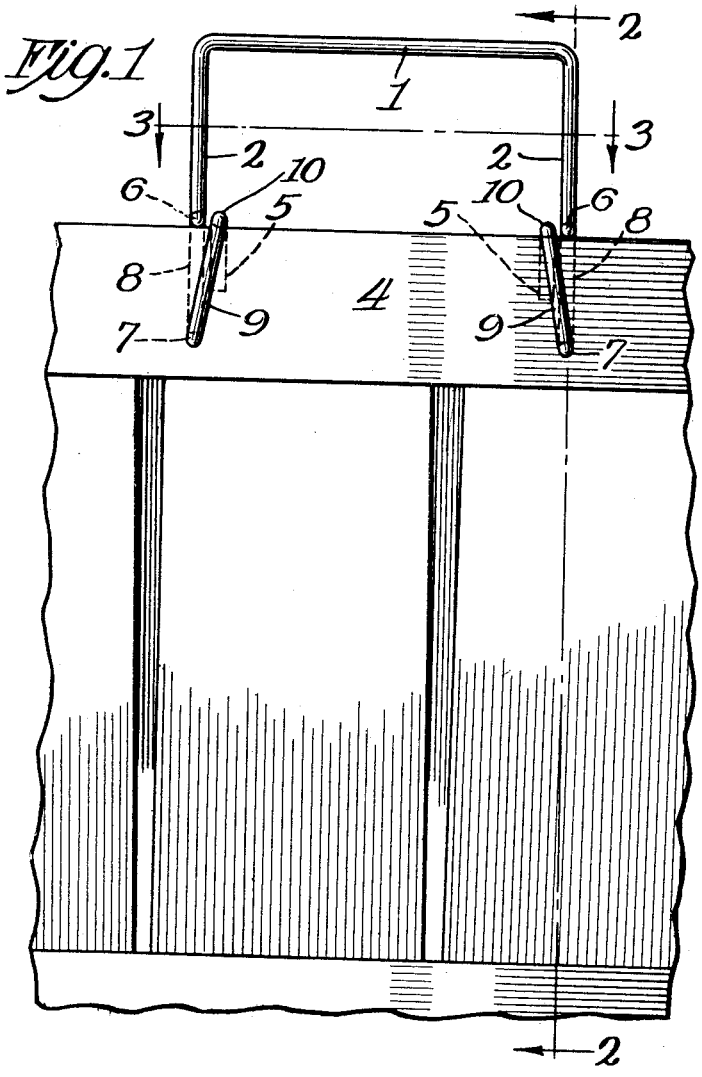
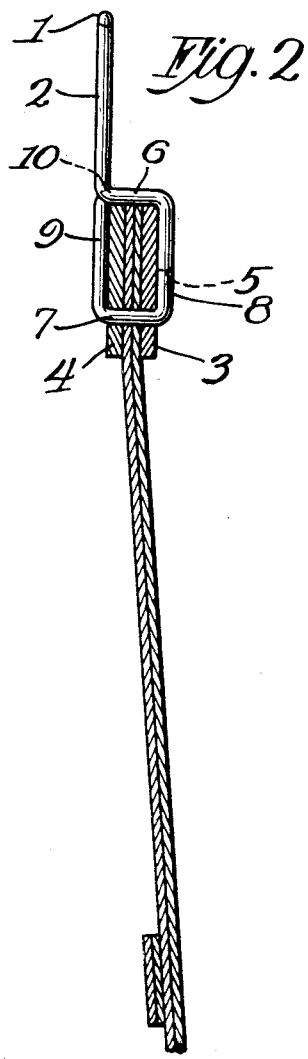
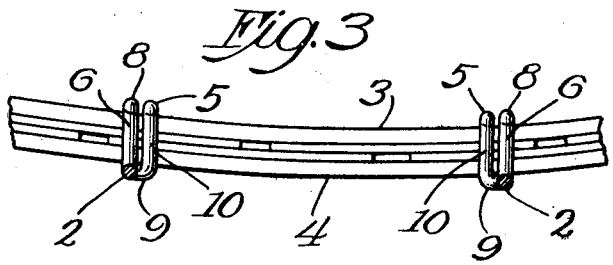
Inventor
Frank H. Dasse
By Arthur F. Durand
Atty.

Patented May 15, 1934

1,958,566

UNITED STATES PATENT OFFICE 1,958,566

BASKET HANDLE

Frank H. Dasse, St. Joseph, Mich., assignor to Saranac Machine Company, Benton Harbor, Mich., a corporation of Michigan Application February 13, 1931, Serial No. 515,484

4 Claims. (Cl. 217—125)

This invention relates to basket handles, or handles for other receptacles, of the kind comprising a length of wire bent into bail shape and having its two lower end·portions suitably attached to the rim of the basket or other receptacle.

Generally stated, the object of the invention is to provide an improved construction and novel arrangement whereby a handle of this kind is effectively fastened in place by means of end portions of the handle, such end portions being inserted outwardly through the rim of the basket or other receptacle, and there being a downwardly bent end for each end portion of the bail-shaped handle.

It is also an object to provide certain details and features of construction and combinations tending to increase the general efficiency and the desirability of a basket handle of this particular character.

To the foregoing and other useful ends, the invention consists in matters hereinafter set forth and claimed and shown in the accompanying drawing, in which—

Fig. 1 is a side elevation of a basket handle embodying the principles of the invention, showing the adjacent portions of the basket or other receptacle to which the handle is attached;

Fig. 2 is a vertical section on line 2—2 in Fig. 1 of the drawing;

Fig. 3 is a horizontal section on line 3—3 in Fig. 1 of the drawing.

As thus illustrated, the invention comprises a wire handle having a horizontal top portion 1 and vertically disposed side portions 2, these side portions being formed with end portions which are inserted outwardly through the inner and outer hoops 3 and 4 of the basket or other receptacle, and which are then bent up and over and down to provide inner downwardly bent portions 5, as shown. In this way, the handle is bail-shaped in general form, and is provided with hook-shaped depending side portions that are hooked through the rim of the basket or other receptacle in the manner shown and described.

To firmly attach the handles in place, each handle has horizontal portions 6 in position to rest on the top of the basket rim, and the lower portions 7 that pierce the hoops, and inner portions 8 that rest against the inner hoop.

In this way, is will be seen, the operation of forming and inserting the handle itself is performed from the inside of the basket or receptacle, so that the wire ends of the handle are inserted outwardly through the rim of the basket or receptacle, and the end portions are then bent up and over and down, as shown.

With the foregoing construction and arrangement, the handle is firmly anchored in the receptacle, and is not liable to be forced or bent away from the side of the receptacle, such distortion of the handle being resisted by the position and formation of the handle wire itself. Preferably, as shown, the portions 7 are disposed a substantial distance below the upper edge of the rim of the basket or receptacle, thus reducing the danger of breakage of the hoop when outward pressure is brought against the handle, tending to pull out the ends. But with the construction shown and described, which is illustrative of the invention, the handles are not liable to become detached, and are so firmly anchored that they are not liable to pull out, for the portions 6, 7, 8 and 9 form strong gripping means between the inner and outer sides of the rim.

A basket cover will rest on the portions 6 of the handles. This will tend to keep the handle from pulling the portions 6 upward, when the basket is lifted.

When the structure is viewed in vertical section as in Fig. 2, it will be seen that the vertical portions 2 are in the plane of the outer side of the rim of the basket, in the plane of the outer bent portions 9, which latter are oblong when viewed in side elevation as shown in Fig. 1 of the drawing. The portions 5 and 9 are connected together by the horizontal portions 10 as shown, these portions 10 resting on the top of the rim of the basket, immediately inside of the horizontal portion 6 previously described. This produces a strong handle and obviates the necessity of using staples to assist in securing the handle to the basket or other receptacle.

What I claim as my invention is:

1. A wire basket handle formed by inserting the wire through the basket rim and bending the wire to attach the handle in place, comprising upright side portions for the handle disposed substantially or practically in the plane of the outer side of the basket rim, a top portion extending between the upper ends of the two side portions, horizontal portions extending inwardly from the lower ends of said side portions across the upper edge of the basket rim, upright portions extending downwardly from said horizontal portions inside the basket rim, horizontal portions extending outwardly from said inside upright portions through the basket rim, outer portions extending upwardly from said lower horizontal portions, other portions extending inwardly across the basket rim from the upper ends of said outer upright portions, at one side of each of said first-mentioned horizontal portions, and inside portions extending downwardly at the same side from the inner ends of said last-mentioned inwardly extending portions, said handle thereby having two horizontal portions of wire bent across the upper edge of the basket rim in the same horizontal plane at the lower end of each of said upright side portions, so that a cover will rest firmly on both of these horizontal portions, and whereby the manipulation of the handle and any disturbance of said first-mentioned horizontal portions in securing the cover in place will not disturb said inside portions.

2. A structure as specified in claim 1, both of said portions at the lower end of each side portion of the handle extending parallel with each other on the upper edge of said rim, whereby there are two parallel horizontal portions of wire at the lower end of each side portion of the handle.

3. A structure as specified in claim 1, said basket rim engaging portions of the handle being so relatively formed that the three horizontally disposed portions that engage the rim at each side of the handle are all parallel on the rim, providing in all six horizontal and parallel wire portions for solidly attaching the handle to the basket rim.

4. A structure as specified in claim 1, said last-mentioned inwardly bent portions of the wire being disposed between the upright side portions of the handle, whereby said outer upright portions that engage the outer side of the rim are inclined toward each other.

FRANK H. DASSE.